(12) United States Patent
Grajcar et al.

(10) Patent No.: US 10,485,072 B2
(45) Date of Patent: Nov. 19, 2019

(54) SHUNT REGULATOR FOR SPECTRAL SHIFT CONTROLLED LIGHT SOURCE

(71) Applicant: SIGNIFY NORTH AMERICA CORPORATION, Somerset, MN (US)

(72) Inventors: Zdenko Grajcar, Orono, MN (US); Leif Erickson, Saint Paul, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 0 days.

(21) Appl. No.: 16/117,472

(22) Filed: Aug. 30, 2018

(65) Prior Publication Data

US 2019/0014636 A1 Jan. 10, 2019

Related U.S. Application Data

(63) Continuation of application No. 15/005,104, filed on Jan. 25, 2016, now Pat. No. 10,091,857, which is a
(Continued)

(51) Int. Cl.
*H05B 37/00* (2006.01)
*H05B 39/00* (2006.01)
(Continued)

(52) U.S. Cl.
CPC ......... *H05B 33/0866* (2013.01); *A01K 45/00* (2013.01); *H05B 33/083* (2013.01);
(Continued)

(58) Field of Classification Search
None
See application file for complete search history.

(56) References Cited

U.S. PATENT DOCUMENTS 4,721,062 A * 1/1988 Williams et al.
4,939,426 A * 7/1990 Menard et al.
(Continued)

FOREIGN PATENT DOCUMENTS

CH 662244 A5 9/1987
CN 2479351 Y 2/2002
(Continued)

OTHER PUBLICATIONS

"U.S. Appl. No. 13/355,182, Non Final Office Action dated Oct. 10, 2014", 16 pgs.
(Continued)

*Primary Examiner* — Anh Q Tran

(57) ABSTRACT

A light emitting diode lighting assembly that receives an electrical excitation signal that is varied from a dimming device. Driving circuitry receives the varying input and has first and second paths that each have a plurality of light emitting diodes. Each plurality of light emitting diodes has a threshold voltage with the threshold voltage of the first plurality of diodes being less than the threshold voltage of the second plurality of lighting emitting diodes. The current within the first path is controlled by a current limiting device that is controlled by a resistor that receives input from the second path to gradually turn off the first plurality of light emitting diodes as the second plurality of lighting emitting diodes increase in intensity. A shunt voltage regulator within the circuit having a threshold voltage that is above threshold voltages of components in the assembly to minimize voltage increases in the assembly.

16 Claims, 9 Drawing Sheets

Related U.S. Application Data continuation of application No. 14/619,163, filed on Feb. 11, 2015, now Pat. No. 9,247,603.

(60) Provisional application No. 61/938,267, filed on Feb. 11, 2014.

(51) Int. Cl.
 *H05B 41/00* (2006.01)
 *H05B 33/08* (2006.01)
 *A01K 45/00* (2006.01)

(52) U.S. Cl.
 CPC ..... *H05B 33/0815* (2013.01); *H05B 33/0827* (2013.01); *H05B 33/0845* (2013.01)

(56) References Cited

U.S. PATENT DOCUMENTS

| | | | |
|---|---|---|---|
| 5,036,797 A * | 8/1991 | Koozer | |
| 5,495,147 A * | 2/1996 | Lanzisera | |
| 5,575,459 A * | 11/1996 | Anderson | |
| 5,602,709 A * | 2/1997 | Al-Dabbagh | |
| 6,016,038 A * | 1/2000 | Mueller et al. | |
| 6,166,496 A * | 12/2000 | Lys et al. | |
| 6,252,254 B1 * | 6/2001 | Soules et al. | |
| 6,357,889 B1 * | 3/2002 | Duggal et al. | |
| 6,461,019 B1 * | 10/2002 | Allen | |
| 6,636,003 B2 * | 10/2003 | Rahm et al. | |
| 6,766,767 B2 * | 7/2004 | El Halawani et al. | |
| 6,789,500 B2 * | 9/2004 | Rozenboim | |
| 6,933,707 B2 * | 8/2005 | Allen | |
| 6,953,266 B1 * | 10/2005 | Ver Hage et al. | |
| 7,038,399 B2 * | 5/2006 | Lys et al. | |
| 7,081,722 B1 * | 7/2006 | Huynh et al. | |
| 7,102,334 B2 * | 9/2006 | Wiegand et al. | |
| 7,102,344 B1 * | 9/2006 | Short | |
| 7,131,397 B2 * | 11/2006 | El Halawani et al. | |
| 7,213,942 B2 * | 5/2007 | Jiang et al. | |
| 7,288,902 B1 * | 10/2007 | Melanson | |
| 7,352,138 B2 * | 4/2008 | Lys et al. | |
| 7,358,679 B2 * | 4/2008 | Lys et al. | |
| 7,378,805 B2 * | 5/2008 | Oh et al. | |
| 7,391,630 B2 * | 6/2008 | Acatrinei | |
| 7,425,801 B2 * | 9/2008 | Ozaki | |
| 7,489,086 B2 * | 2/2009 | Miaskin | |
| 7,709,774 B2 * | 5/2010 | Schulz | |
| 7,737,643 B2 | 6/2010 | Lys | |
| D621,973 S | 8/2010 | Grajcar | |
| D621,974 S | 8/2010 | Grajcar | |
| 7,781,979 B2 * | 8/2010 | Lys | |
| 7,791,289 B2 * | 9/2010 | Oosterbaan et al. | |
| 7,847,486 B2 * | 12/2010 | Ng | |
| 7,847,496 B2 * | 12/2010 | Bui et al. | |
| 7,859,196 B2 * | 12/2010 | Lee et al. | |
| 7,863,831 B2 * | 1/2011 | Vos | |
| D632,837 S | 2/2011 | Grajcar | |
| 7,880,400 B2 | 2/2011 | Zhou et al. | |
| 7,902,769 B2 | 3/2011 | Shteynberg et al. | |
| 7,936,135 B2 | 5/2011 | Hum et al. | |
| D641,520 S | 7/2011 | Grajcar | |
| 7,977,892 B2 | 7/2011 | Lee et al. | |
| 8,102,167 B2 | 1/2012 | Irissou et al. | |
| 8,120,279 B2 | 2/2012 | Oosterbaan et al. | |
| 8,134,303 B2 | 3/2012 | Lys | |
| 8,159,125 B2 | 4/2012 | Miao | |
| 8,164,276 B2 | 4/2012 | Kuwabara | |
| 8,188,679 B2 | 5/2012 | Hoogzaad | |
| 8,188,687 B2 | 5/2012 | Lee et al. | |
| 8,324,642 B2 | 12/2012 | Grajcar | |
| 8,324,840 B2 | 12/2012 | Shteynberg et al. | |
| 8,373,363 B2 | 2/2013 | Grajcar | |
| 8,384,307 B2 | 2/2013 | Grajcar | |
| 8,531,136 B2 | 9/2013 | Grajcar | |
| 8,593,044 B2 | 11/2013 | Grajcar | |
| 8,596,804 B2 | 12/2013 | Grajcar | |
| 8,598,799 B2 | 12/2013 | Tai et al. | |
| 8,643,308 B2 | 2/2014 | Grajcar | |
| D701,497 S | 3/2014 | Grajcar | |
| 8,736,194 B2 | 5/2014 | Kawai et al. | |
| 8,773,031 B2 | 7/2014 | Sadwick et al. | |
| 8,796,955 B2 | 8/2014 | Grajcar | |
| 8,858,005 B2 | 10/2014 | Grajcar | |
| 8,876,313 B2 | 11/2014 | Grajcar | |
| D719,684 S | 12/2014 | Grajcar | |
| 8,907,576 B2 | 12/2014 | Ferrier | |
| 8,922,136 B2 | 12/2014 | Grajcar | |
| 9,155,151 B2 | 10/2015 | Angeles | |
| 9,210,755 B2 | 12/2015 | Grajcar et al. | |
| 9,247,603 B2 | 1/2016 | Grajcar et al. | |
| 9,374,858 B2 | 6/2016 | Ni | |
| 9,380,665 B2 | 6/2016 | Grajcar et al. | |
| 9,433,046 B2 * | 8/2016 | Grajcar | H05B 33/0824 |
| 9,482,397 B2 | 11/2016 | Grajcar | |
| 9,700,019 B2 | 7/2017 | Grajcar et al. | |
| 9,709,228 B2 | 7/2017 | Grajcar | |
| 9,756,837 B2 | 9/2017 | Grajcar | |
| 10,091,857 B2 | 10/2018 | Grajcar et al. | |
| 2002/0003233 A1 | 1/2002 | Mueller-Mach | |
| 2002/0047606 A1 | 4/2002 | Guthrie et al. | |
| 2002/0097007 A1 | 7/2002 | Koncz et al. | |
| 2002/0149929 A1 | 10/2002 | Evans et al. | |
| 2003/0164809 A1 | 9/2003 | Leung | |
| 2003/0172878 A1 | 9/2003 | El Halawani et al. | |
| 2005/0212458 A1 | 9/2005 | Powers, Jr. et al. | |
| 2005/0256554 A1 | 11/2005 | Malak | |
| 2005/0280964 A1 | 12/2005 | Richmond et al. | |
| 2006/0214603 A1 | 9/2006 | Oh et al. | |
| 2007/0086912 A1 | 4/2007 | Dowling et al. | |
| 2007/0182338 A1 | 8/2007 | Shteynberg et al. | |
| 2007/0258240 A1 | 11/2007 | Ducharme et al. | |
| 2008/0012722 A1 | 1/2008 | Moseley et al. | |
| 2008/0017120 A1 | 1/2008 | Hawk | |
| 2008/0042588 A1 | 2/2008 | Chan et al. | |
| 2008/0116816 A1 | 5/2008 | Neuman et al. | |
| 2008/0174233 A1 | 7/2008 | Bawendi et al. | |
| 2008/0202443 A1 | 8/2008 | Potter | |
| 2008/0203936 A1 | 8/2008 | Mariyama et al. | |
| 2008/0211421 A1 | 9/2008 | Lee et al. | |
| 2009/0096739 A1 | 4/2009 | Lan et al. | |
| 2009/0160370 A1 | 6/2009 | Tai et al. | |
| 2009/0185373 A1 | 7/2009 | Grajcar | |
| 2009/0262515 A1 | 10/2009 | Lee et al. | |
| 2009/0267534 A1 | 10/2009 | Godbole et al. | |
| 2010/0013402 A1 | 1/2010 | Chaffai et al. | |
| 2010/0060175 A1 | 3/2010 | Lethellier | |
| 2010/0072903 A1 | 3/2010 | Blaut et al. | |
| 2010/0164579 A1 | 7/2010 | Acatrinei | |
| 2010/0165677 A1 | 7/2010 | Wang et al. | |
| 2010/0225241 A1 | 9/2010 | Maehara et al. | |
| 2010/0237800 A1 | 9/2010 | Kang et al. | |
| 2010/0294205 A1 | 11/2010 | Kakimi et al. | |
| 2010/0308739 A1 | 12/2010 | Shteynberg et al. | |
| 2010/0308751 A1 | 12/2010 | Nerone | |
| 2011/0018465 A1 | 1/2011 | Ashdown | |
| 2011/0031890 A1 | 2/2011 | Stack et al. | |
| 2011/0037415 A1 | 2/2011 | Juestel et al. | |
| 2011/0084619 A1 | 4/2011 | Gray | |
| 2011/0101883 A1 | 5/2011 | Grajcar | |
| 2011/0109244 A1 | 5/2011 | Grajcar | |
| 2011/0163680 A1 | 7/2011 | Welten | |
| 2011/0210678 A1 | 9/2011 | Grajcar | |
| 2011/0227490 A1 | 9/2011 | Huynh | |
| 2011/0228515 A1 | 9/2011 | Grajcar | |
| 2011/0273103 A1 | 11/2011 | Hong | |
| 2012/0001558 A1 | 1/2012 | Vos | |
| 2012/0002408 A1 | 1/2012 | Lichten et al. | |
| 2012/0025709 A1 | 2/2012 | Zampini et al. | |
| 2012/0081009 A1 | 4/2012 | Shteynberg et al. | |
| 2012/0081018 A1 | 4/2012 | Shteynberg et al. | |
| 2012/0153833 A1 | 6/2012 | Mikani et al. | |
| 2012/0186524 A1 | 7/2012 | Grajcar | |
| 2012/0200229 A1 | 8/2012 | Kunst et al. | |
| 2012/0223649 A1 | 9/2012 | Saes et al. | |
| 2012/0268918 A1 | 10/2012 | Grajcar | |

(56) References Cited

U.S. PATENT DOCUMENTS

| | | |
|---|---|---|
| 2012/0299500 A1 | 11/2012 | Sadwick et al. |
| 2013/0016506 A1 | 1/2013 | Odom, Jr. |
| 2013/0069536 A1 | 3/2013 | Ni |
| 2013/0069546 A1 | 3/2013 | Lin et al. |
| 2013/0127356 A1 | 5/2013 | Tanaka et al. |
| 2013/0134888 A1 | 5/2013 | Grajcar |
| 2013/0153938 A1 | 6/2013 | Grajcar |
| 2013/0157394 A1 | 6/2013 | Gr |
| 2013/0169159 A1 | 7/2013 | Lys |
| 2013/0187572 A1 | 7/2013 | Grajcar |
| 2013/0193864 A1 | 8/2013 | Angeles |
| 2013/0200812 A1 | 8/2013 | Radermacher et al. |
| 2013/0207555 A1 | 8/2013 | Qiu et al. |
| 2013/0234622 A1 | 9/2013 | Tanaka et al. |
| 2013/0342120 A1 | 12/2013 | Creusen et al. |
| 2014/0077709 A1 | 3/2014 | Zhang et al. |
| 2014/0098531 A1 | 4/2014 | Grajcar |
| 2014/0103823 A1 | 4/2014 | Kahman et al. |
| 2014/0111091 A1 | 4/2014 | Grajcar et al. |
| 2014/0159584 A1 | 6/2014 | Grajcar |
| 2014/0197741 A1 | 7/2014 | Sakai et al. |
| 2014/0197751 A1 | 7/2014 | Grajcar |
| 2014/0210352 A1 | 7/2014 | Grajcar |
| 2014/0210357 A1* | 7/2014 | Yan .................... H05B 33/0824 315/186 |
| 2015/0061534 A1 | 3/2015 | Grajcar |
| 2015/0069932 A1 | 3/2015 | Grajcar |
| 2015/0115845 A1 | 4/2015 | Grajcar |
| 2015/0230309 A1 | 8/2015 | Grajcar et al. |
| 2015/0237696 A1 | 8/2015 | Shackle |
| 2016/0113079 A1 | 4/2016 | Hiramatu et al. |
| 2016/0212817 A1 | 7/2016 | Grajcar et al. |
| 2016/0323960 A1 | 11/2016 | Grajcar |
| 2017/0000163 A1 | 1/2017 | Grajcar |
| 2017/0064781 A1 | 3/2017 | Haskvitz |
| 2017/0105391 A1 | 4/2017 | Grajcar |

FOREIGN PATENT DOCUMENTS

| | | |
|---|---|---|
| CN | 101162847 A | 4/2008 |
| CN | 100392878 C | 6/2008 |
| CN | 102612791 A | 7/2012 |
| CN | 104106122 A | 10/2014 |
| EP | 0064175 A1 | 11/1982 |
| EP | 1502483 A1 | 2/2005 |
| EP | 2094063 A1 | 8/2009 |
| EP | 2465174 A1 | 2/2011 |
| EP | 2465329 A1 | 7/2012 |
| EP | 2666220 A2 | 7/2012 |
| EP | 2795654 A1 | 10/2014 |
| JP | 05199823 | 8/1993 |
| JP | 2004248333 A | 9/2004 |
| JP | 2005137238 A | 6/2005 |
| JP | 2006147933 A | 6/2006 |
| JP | 2006244848 A | 9/2006 |
| JP | 2007511903 A | 5/2007 |
| JP | 2007299788 A | 11/2007 |
| JP | 2008059811 A | 3/2008 |
| JP | 2008218043 A | 9/2008 |
| JP | 2009026544 A | 2/2009 |
| JP | 2009035673 A | 2/2009 |
| JP | 2009060069 A | 3/2009 |
| JP | 2009117036 A | 5/2009 |
| JP | 2009123427 A | 6/2009 |
| JP | 2009171866 A | 6/2009 |
| JP | 2011040701 A | 2/2011 |
| JP | 2014516452 A | 7/2014 |
| JP | 5676611 B2 | 1/2015 |
| KR | 20120112146 A | 10/2012 |
| WO | WO-2001006630 A1 | 1/2001 |
| WO | WO-2005084080 A2 | 9/2005 |
| WO | WO-2008114250 A1 | 9/2008 |
| WO | WO-2010037009 A1 | 4/2010 |
| WO | WO-2012100183 A2 | 7/2012 |
| WO | WO-2013100736 A1 | 7/2013 |
| WO | WO-2013169159 A1 | 11/2013 |
| WO | WO-2014052897 A1 | 4/2014 |
| WO | WO-2014200960 A1 | 12/2014 |
| WO | WO-2015002665 A1 | 1/2015 |
| WO | WO-2015038720 A1 | 3/2015 |
| WO | WO-2015105776 A1 | 7/2015 |

OTHER PUBLICATIONS

"U.S. Appl. No. 13/676,358, Non Final Office Action filed Mar. 12, 2015", 33 pgs.

"U.S. Appl. No. 14/144,298, Non Final Office Action dated Sep. 22, 2014", 8 pgs.

"U.S. Appl. No. 14/160,721, Final Office Action dated Jan. 28, 2015", 11 pgs.

"U.S. Appl. No. 14/160,721, Non Final Office Action dated Aug. 15, 2014", 14 pgs.

"U.S. Appl. No. 14/170,760, Non Final Office Action dated Oct. 3, 2014", 18 pgs.

"U.S. Appl. No. 14/514,612, Non Final Office Action dated Apr. 8, 2015", 6 pgs.

"U.S. Appl. No. 14/619,163, Notice of Allowance dated Sep. 23, 2015", 9 pgs.

"U.S. Appl. No. 15/005,104, Final Office Action dated Jan. 20, 2017", 7 pgs.

"U.S. Appl. No. 15/005,104, Non Final Office Action dated May 27, 2016", 5 pgs.

"U.S. Appl. No. 15/005,104, Notice of Allowance dated Jan. 22, 2018", 5 pgs.

"U.S. Appl. No. 15/005,104, Notice of Allowance dated May 18, 2018", 5 pgs.

"U.S. Appl. No. 15/005,104, Notice of Allowance dated Aug. 21, 2017", 7 pgs.

"U.S. Appl. No. 15/005,104, Response filed Jul. 19, 2017 to Final Office Action dated Jan. 20, 2017", 5 pgs.

"U.S. Appl. No. 15/005,104, Response filed Oct. 26, 2016 to Non Final Office Action dated May 27, 2016", 5 pgs.

"U.S. Appl. No. 15/108,705, Non Final Office Action dated Jan. 6, 2017", 11 pgs.

"U.S. Appl. No. 15/108,705, Non Final Office Action dated Jan. 19, 2018", 10 pgs.

"U.S. Appl. No. 15/108,705, Response filed Jun. 19, 2018 to Non Final Office Action dated Jan. 19, 2018", 8 pgs.

"U.S. Appl. No. 15/108,705, Response filed Jul. 6, 2017 to Non Final Office Action dated Jan. 6, 2017", 8 pgs.

"U.S. Appl. No. 15/735,446 EP Search Report dated Jul. 26, 2017", 9 pgs.

"Chinese Application Serial No. 2010800467911, Office Action dated Feb. 10, 2014", W/ English Translation, 6 pgs.

"Chinese Application Serial No. 2010800467911, Office Action dated Sep. 3, 2014", W/ English Translation, 2 pgs.

"Chinese Application Serial No. 201080046880.6, Office Action dated Jan. 24, 2014", W/ English Translation, 7 pgs.

"CN Application Serial No. 2013/800786639 Global Dossier Translation of First Office Action dated Mar. 3, 2017", 7 pgs.

"CN Application Serial No. 2013/800786639 Global Dossier Translation of Second Office Action dated Nov. 1, 2017", 7 pgs.

"CN Application Serial No. 2014/800610231 Global Dossier Translation of First Office Action dated Mar. 28, 2017", 5 pgs.

"European Application No. EP10827580.1 Extended European_Search_Report_dated Feb. 5, 2016", (Feb. 5, 2016), 6 pgs.

"European Application No. EP11757037.4 European_Search_Report_ dated Nov. 24, 2017", (Nov. 24, 2017), 9 pgs.

"European Application No. EP12739301.5 European_Search_Report_ dated Nov. 24, 2017", (Nov. 24, 2017), 10 pgs.

"European Application No. EP15735446.5 European_Search_Report_ dated Jul. 26, 2017", (Jul. 26, 2017), 9 pgs.

"European Application Serial No. 14/843579.5 search report dated Apr. 28, 2017", 5 pgs.

"Hazard of Harmonics and Neutral Overloads", American Power Conversion Legendary Reliability: White Paper #26, (2003), 8 pgs.

(56) References Cited

OTHER PUBLICATIONS

"International Application Serial No. PCT/US2010/045467, International Preliminary Report on Patentability dated Feb. 14, 2012", 7 pgs.
"International Application Serial No. PCT/US2010/045467, International Search Report dated Oct. 7, 2010", 2 pgs.
"International Application Serial No. PCT/US2010/045467, Written Opinion dated Oct. 7, 2010", 6 pgs.
"International Application Serial No. PCT/US2010/054506, International Preliminary Report on Patentability dated May 1, 2012", 7 pgs.
"International Application Serial No. PCT/US2010/054506, International Search Report dated Dec. 28, 2010", 2 pgs.
"International Application Serial No. PCT/US2010/054506, Written Opinion dated Dec. 28, 2010", 6 pgs.
"International Application Serial No. PCT/US2010/054869, International Search Report dated Jan. 12, 2011", (Jan. 12, 2011), 2 pgs.
"International Application Serial No. PCT/US2010/054869, International Written Opinion dated Jan. 12, 2011", (Jan. 12, 2011), 4 pgs.
"International Application Serial No. PCT/US2011/028910, International Preliminary Report on Patentabililty dated Sep. 18, 2012", 5 pgs.
"International Application Serial No. PCT/US2011/028910, International Search Report dated May 26, 2011", 2 pgs.
"International Application Serial No. PCT/US2012/022059, International Preliminary Report on Patentability dated Mar. 25, 2014", 8 pgs.
"International Application Serial No. PCT/US2012/022370, International Search Report dated May 25, 2012", (May 25, 2018), 2 pgs.
"International Application Serial No. PCT/US2012/022370, Written Opinion dated May 25, 2012", (May 25, 2012), 5 pgs.
"International Application Serial No. PCT/US2013/078368 International Search Report dated Mar. 27, 2014", 3 pgs.
"International Application Serial No. PCT/US2013/078368, International Preliminary Report on Patentabililty dated Jan. 14, 2016", 8 pgs.
"International Application Serial No. PCT/US2013/078368, Written Opinion dated Mar. 27, 2014", 6 pgs.
"International Application Serial No. PCT/US2014/049143, International Search Report dated Nov. 6, 2014", (Nov. 6, 2014), 2 pgs.
"International Application Serial No. PCT/US2014/049143, Written Opinion dated Nov. 6, 2014", 4 pgs.
"International Application Serial No. PCT/US2014/055106, International Preliminary Report on Patentabililty dated Mar. 24, 2016", 4 pgs.
"International Application Serial No. PCT/US2014/055106, International Search Report dated Dec. 18, 2014", 2 pgs.
"International Application Serial No. PCT/US2014/055106, Written Opinion dated Dec. 18, 2014", 3 pgs.
"International Application Serial No. PCT/US2015/010268, International Preliminary Report on Patentability dated Jul. 21, 2016", 6 pgs.
"International Application Serial No. PCT/US2015/010268, International Search Report dated May 1, 2015", 2 pgs.
"International Application Serial No. PCT/US2015/010268, Written Opinion dated May 1, 2015", 4 pgs.
"International Application Serial No. PCT/US2016/049433, International Preliminary Report on Patentabililty dated Mar. 6, 2018", 7 pgs.

"International Application Serial No. PCT/US2016/049433, International Search Report dated Nov. 15, 2016", 2 pgs.
"International Application Serial No. PCT/US2016/049433, Written Opinion dated Nov. 15, 2016", 6 pgs.
"International Application Serial No. PCT/US2017/024679, International Search Report dated Aug. 2, 2017", (Aug. 2, 2017), 4 pgs.
"International Application Serial No. PCT/US2017/024679, Invitation to Pay Additional Fees and Partial Search Report dated Jun. 7, 2012", (Jun. 7, 2012), 2 pgs.
"Japanese Application Serial No. 2012-524899, Office Action filed Feb. 25, 2014", W/ English Translation, 6 pgs.
"Japanese Application Serial No. 2012-524901, Office Action filed Mar. 26, 2015", W/ English Translation, 6 pgs.
"Sequential Linear LED Driver", Supertex inc. : Doc.# DSFP-CL8800, (2014), 7 pgs.
"TPS92411x Floating Switch for Offline AC Linear Direct Drive of LEDs with Low Ripple Current", Texas Instruments: SLUSBQ6B, (Oct. 2013), 29 pgs.
Clarke, S, et al., "Energy Efficient Swine Lighting", Ontario Ministry of Agriculture Food and Rural Affairs, (Jan. 2006), 8 pgs.
Dartnall, H. J.A, et al., "Human Visual Pigments: Microspectrophotometric Results from the Eyes of Seven Persons", Proceedings of the Royal Society of London. Series B, Biological Sciences 220(1218), (Nov. 22, 1983), 115-130.
Davis, N. J, et al., "Preferences of Growing Fowls for Different Light Intensities in Relation to Age, Strain and Behaviour", Animal Welfare 8(3), (199), 193-203.
Gustafsson, G, et al., "Laying hens reactions on artificial light in a floor housing system", Agric Eng Int: CIGR Journal vol. 12, No. 2, (Jun. 2010), 21-30.
Halevy, O., et al., "Muscle development—Could environmental manipulations during embryogenesis of broilers change it?", EPC 2006—12th European Poultry Conference, (Sep. 2006), 7 pgs.
Kennedy, Donald, et al., "Selective Light Absorption by the Lenses of Lower Vertebrates, and Its Influence O N Spectral Sensitivity", The Biological Laboratories, Harvard University; Marine Biological Laboratory; and U. S . Fish and Wildlife Service Laboratory, Woods Hole, Mass., (1956), 12 pgs.
Manci, William E, et al., "Design and Performance of an Electronic Lighting-Control Circuit That Simulates Sunrise and Sunset", The Progressive Fish-Culturist 54, (1992), 127-129.
Rahimi, G., et al., "The Effect of Intermittent Lighting Schedule on Broiler Performance", International Journal of Poultry Science, 4(6), (2005), 396-398.
Rozenboim, I., et al., "The effect of a green and blue monochromatic light combination on broiler growth and development", Poultry Science, 83(5), (2004), 842-845.
Rozenboim, I., et al., "The Effect of Monochromatic Light on Broiler Growth and Development", Poultry Science, 78(1), (1999), 135-138.
Taylor, Todd, "Great Green Hope: The Corporate Love Affair With Algae", Biomass Magazine, (Apr. 2010), 2 pgs.
U.S. Appl. No. 15/108,705, filed Jun. 28, 2016, DC LED Agricultural Lighting Assembly.
U.S. Appl. No. 14/619,163, U.S. Pat. No. 9,247,603, filed Feb. 11, 2015, Shunt Regulator for Spectral Shift Controlled Light Source.
U.S. Appl. No. 15/005,104, filed Jan. 25, 2016, Shunt Regulator for Spectral Shift Controlled Light Source.
"U.S. Appl. No. 15/108,705, Final Office Action dated Oct. 4, 2018", 11 pgs.

* cited by examiner

SHUNT REGULATOR FOR SPECTRAL SHIFT CONTROLLED LIGHT SOURCE

CROSS-REFERENCE TO RELATED APPLICATIONS

The present application is a continuation of U.S. patent application Ser. No. 15/005,104, filed Jan. 25, 2016, which application is a continuation of U.S. patent application Ser. No. 14/619,163, filed Feb. 11, 2015, which application claims the benefit of priority from U.S. Provisional Patent Application Ser. No. 61/938,267 entitled "Shunt Regulator for Spectral Shift Controlled Light Source" filed on Feb. 11, 2014, the contents of each of which are incorporated herein by reference in their entireties.

BACKGROUND

This invention relates to lighting assemblies. More specifically the present invention relates to circuitry for a DC run agricultural light that changes colors through dimming.

The farming industry has greatly evolved over the past several decades, going from primarily outdoor based family farms to indoor corporate run facilities. For example, poultry are now often housed in cage systems where the chickens move from one place in the system to the next, staying off the ground where they can be harmed. In this manner the facilities house numerous poultry indoors without access to the outside.

As a result, artificial lighting is a main source of lighting for the farm animal, whether incandescent, LED, high pressure sodium, compact fluorescent or the like. As scientists have studied animals, such as chickens, turkeys, swine, cows and the like under artificial light the scientists have come to understand not only how animals see light as compared to humans, but also the effects that characteristics of light have on different animals. Many tests have been conducted related to the effects of lighting on animals such as chickens, turkeys, swine, cows and the like.

In particular, scientists have recognized that photoperiod or the modulation of light to animals is important. Swine studies exist showing that swine raised under continuous darkness for 24 hours were less active than swine raised under a modulated twelve hours of dark and twelve hours of light. Meanwhile swine under 24 hours of light were most active, but also showed increased levels of stress and thus the pigs welfare was considered to be affected by the presence of continuous darkness or light.

Similarly, another characteristic of light shown to effect animals is the irradiance or intensity of light. For example, tests in swine show that piglets raised under 2-6 or even 10 lux do not gain as much weight as compared to 70-100 lux light whereas 2500 lux light showed weight loss. Meanwhile in another test on piglets 50 lux light gave improved health and improved immune status as compared to 10, 20, 40 and 120 lux light. So again, intensity of light is another light characteristic known to effect animals and swine.

A final factor that effects animals, is the spectrum or color of light. Tests on poultry show that the use of different wavelengths of light, such as red or blue wavelengths can result in heavier bodyweight, increased daily gain, decreased mortality, increased egg production and the like.

In addition, a need in the art exists for energy efficient lighting within agricultural facilities. In particular agricultural facilities can contain 50, 100 or more lights depending on the size of the facility. Typically these facilities contain 100 Watt incandescent light bulbs that are a drain on energy and cause power bills to be tremendous. In addition, because of the environment there is an abundance of feces, ammonium, mud, food pieces and the like within the barn. Thus, typically the 100 Watt bulbs must be within a casing or jelly jar of some type to try to protect the lighting from the elements. In addition wash downs expose the lighting to water, again requiring protection for the lighting to prevent breakage, shortage or worse fire conditions.

As a result of this research, agricultural lighting manufacturers have begun manufacturing lighting that present different spectrum of light, such as red or blue to enhance production of the animals. For example U.S. Ser. No. 13/050,910 entitled, Light Sources Adapted to Spectral Sensitivity of Diurnal Avians and Humans to Grajcar that is incorporated in full herein is directed toward light emitting diode (LED) lighting assemblies that can be dimmed in order to provide different wavelengths of light. Thus an assembly can start off red and be dimmed to appear blue or vice versa to accommodate the animal. Similarly, U.S. Ser. No. 13/357,330 entitled, Differential Illumination to Select Egg Laying Sites to Grajcar that is also incorporated in full herein provides for an aviary system for egg laying with similar concepts.

Still problems remain. In particular, the circuitry presented in these applications are directed toward an AC power sources where on occasion a DC based power source is presented as an input. Additionally, occasionally AC power sources can cause flickering and other unintended consequences. Therefore a need in the art exists for an agricultural light that is able to provide growth enhancements through color shifting, yet operates on a DC power supply.

Therefore a principle object of the present invention is to provide a DC circuit that provides color shifting properties.

Another object of the present invention is to provide a robust, cost effective agricultural lighting assembly.

These and other objects, advantages and features will become apparent from the rest of the specification.

SUMMARY

A light emitting diode lighting assembly that includes a dimming device that receives an electrical excitation signal from a DC input and varies the electrical excitation signal to provide increasing and decreasing input voltage. The driving circuitry has first and second current pathways with a first path having a plurality of light emitting diodes therein and a current limiting device that is controlled by a resistor. The second path is in parallel with the first path and has a second plurality of light emitting diodes. The first and second pluralities of light emitting diodes have first and second threshold voltages respectfully that must be reached for the diodes to produce light. The first threshold voltage of the first plurality of light emitting diodes is less than the second threshold of the second light emitting diode so that the first plurality of diodes lights before the second plurality of light emitting diodes. The second plurality of diodes is also in series with the resistor controlling the current limiting device so that once the second threshold voltage is reached the current limiting device first limits and then prevents current flow in the first path and thus prevents the lighting of the first plurality of light emitting diodes. A shunt voltage regulator is in electrical connection with the current limiting device to improve efficiencies of the assembly.

BRIEF DESCRIPTION OF THE DRAWINGS

The drawing figures depict one or more implementations in accord with the present teachings, by way of example

DETAILED DESCRIPTION OF A PREFERRED EMBODIMENT OF THE INVENTION

Figure 1:
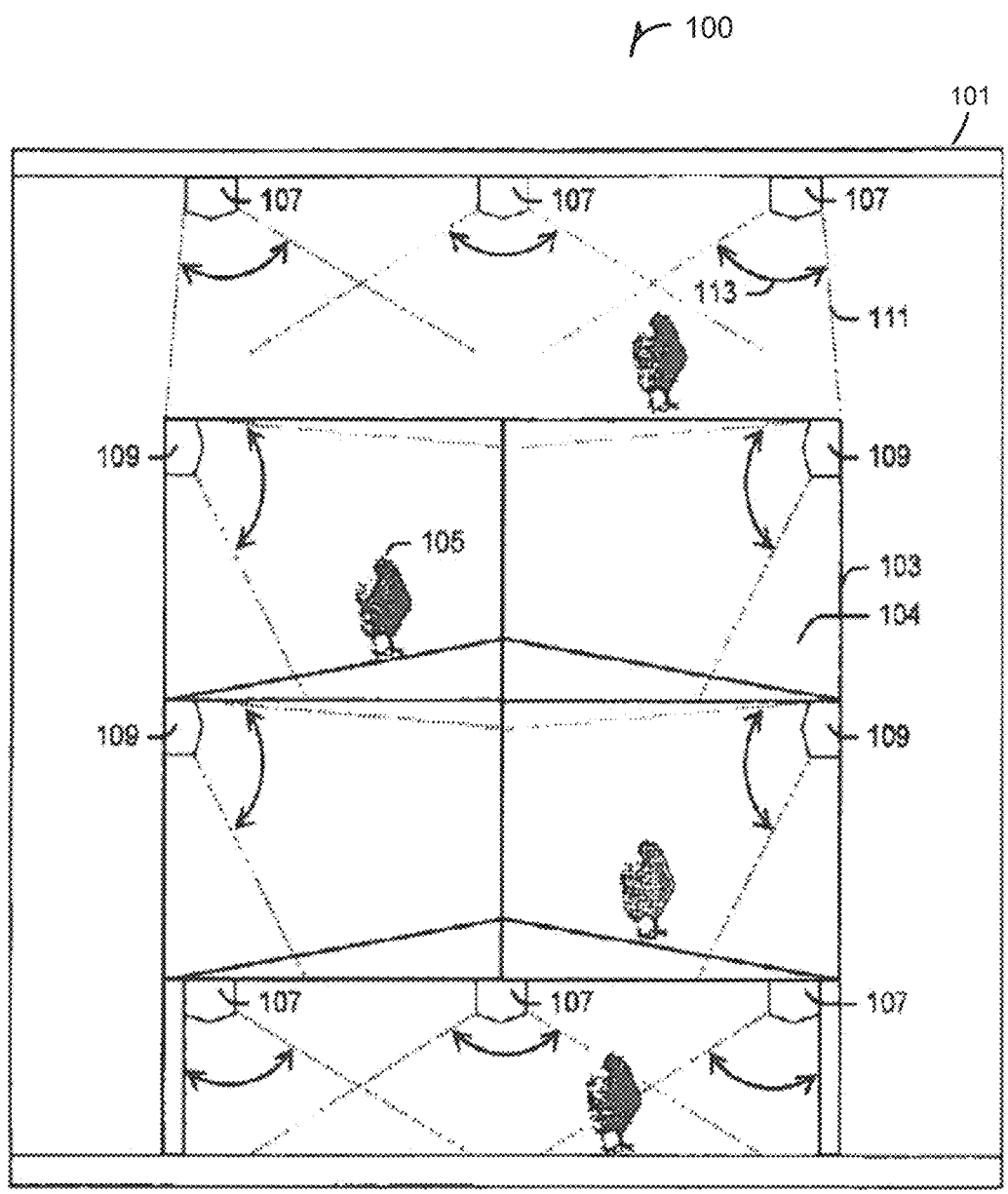
FIG. 1 shows a cross-sectional view of an enclosure containing an aviary system and having a differential illumination system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Egg production facilities are highly mechanized, and typically include systems for automatically retrieving eggs laid by the chicken, poultry, or other animals promptly after the eggs have been laid. The egg retrieval systems are designed to retrieve eggs from nests or other areas specially designed for laying eggs. Animals typically like to lay eggs in areas that are dark and closed off. Nests are therefore generally designed to be dark and partially closed off (while still maintaining open access for the animals), so as to encourage animals to lay eggs in them.

While a large proportion of eggs are laid in nests or other designated egg laying areas, many eggs are laid outside of these areas. In caged facilities, eggs may be laid in non-nest areas of a cage. In cage-free facilities, eggs may be laid in non-nest areas of an aviary system, or in non-nest areas of an enclosure containing the aviary system. While some egg retrieval systems retrieve eggs from non-nest areas that house animals, such systems do not retrieve all of the mislaid eggs and at least some of these eggs are typically lost.

Behavioral and physiological studies show that animal behavior is influenced by exposure to light in general, and to particular wavelengths of light in particular. For example, exposure to red light (or to light having a red hue) can increase the growth rate of chickens and turkeys at the beginning of the rearing period, increase locomotion that helps minimize leg disorders in the late rearing period, stimulate and promote sexual activity, and reduce feed consumption per egg laid with no differences in egg size, shell weight, shell thickness, or yolk and albumen weights. However, the exposure to red light (or to light having a red hue) can promote cannibalism in broilers. On the other hand, exposure to green and blue light (or to light having green or blue hues) can significantly enhance the animals' growth rate at an early age by enhancing proliferation of skeletal muscle satellite cells, enhance growth at a later age by elevating plasma androgens (in the case of blue light), promote myofiber growth due to more effective stimulation of testosterone secretion, reduce locomotion (in the case of narrow band blue light), and reduce cannibalism rates at late age in broilers (in the case of narrow band blue light).

Light, and more particularly the color or spectrum of light, may therefore be used to influence the behaviors of animals. As used herein, light generally refers to electromagnetic radiation, and more particularly to radiation having wavelengths in the range of 300 to 800 nm. The human eye is sensitive to radiation having wavelengths in the range of 400 to 700 nm, with a peak of sensitivity at around 550 nm (corresponding to green light). However, domestic fowl are sensitive to a broader range of wavelengths both through their eyes, and through their skulls using receptors located in the pineal gland and in the hypothalamus. In particular, domestic fowl are sensitive to light having wavelengths in the range of 300 to 800 nm. Domestic fowls have peak sensitivities to light having wavelengths of around 480 nm (corresponding to blue light), 570 nm (corresponding to green-yellow light), and at 630 nm (corresponding to red light). As such, we refer to light as any radiation in a range of 300 to 800 nm to which animals are visually sensitive (e.g., through eyes) or physiologically sensitive (e.g., through other receptors, such as receptors in the pineal gland and hypothalamus), including radiation commonly referred to as ultra-violet (UV) and infrared (IR).

Light can have different spectrums or spectral contents depending on the particular mixture and relative intensity of wavelengths included in the light. For example, white light (such as natural daylight) generally has a spectrum including a mixture of radiations from 300 to 800 nm at relatively similar intensities. Red light (or reddish light) has a spectrum predominantly (or only) including radiation having wavelengths in the "red" range of 635-700 nm (and more generally, wavelengths over 620 nm). Blue light (or bluish light) has a spectrum predominantly (or only) including radiation having wavelengths in the "blue" range of 450-490 nm (and more generally, wavelengths below 500 nm). Green light (or greenish light) has a spectrum predominantly (or only) including radiation having wavelengths in the "green" range of 490-560 nm. A light spectrum predominantly includes radiation of a particular wavelength or range of wavelengths if the relative luminous power (or energy content) of those particular wavelength(s) is higher than the luminous power (or energy content) of other wavelengths in the light spectrum. However, a light that is substantially of a given color can including radiation having a range of wavelengths of the given color, as well as radiation of other wavelengths.

An egg production or other animal facility, such as a cage-free egg production facility, includes a set of enclosures. Each enclosure can be a room, a pen, a corral, a fenced area, a cage, or the like, which houses a group of animals. Animals are able to move within one enclosure, but are generally restricted from moving between different enclosures. Different areas or volumes within the enclosure can be designated for particular uses. For example, a feeding area may be designated around a feeder or other food source in the enclosure, and a watering area may be designated around a water source. Light sources, such as lamps or bulbs, can be installed in or around the enclosure to illuminate different areas of the enclosure. In some examples, directional light sources are used to concentrate, focus, or contain the illumination from each light source within a particular area of the enclosure.

The light sources in the enclosure can produce light with different spectrums, so as to illuminate particular areas of the enclosure with different colored light. The color or spectrum of each light source can be selected so as to promote or encourage certain behaviors in particular areas of the enclosure, and/or to hinder or discourage the same or other behaviors in other areas of the enclosure. For example, a first light source having a spectrum selected so as to encourage feeding may be used to illuminate a feeding area of the enclosure. Additionally or alternatively, a second light source having a spectrum selected so as to encourage egg laying may be used to illuminate a nesting area of the enclosure. The color or spectrum of each light source can also be selected so as to promote or encourage certain behaviors at certain times, and/or to hinder or discourage behaviors at other times. For example, a first light source having a spectrum selected so as to encourage feeding may be used to illuminate all or part of the enclosure at a feeding time (e.g., during a particular time-period every day). Additionally or alternatively, a second light source having a spectrum selected so as to encourage cannibalism at a late age may be used to illuminate all or part of the enclosure when the animals in the enclosure reach the late age.

FIG. 1 shows a cross-sectional view of an enclosure 101 containing an aviary system 103 for housing animals. The enclosure 101 may be one of many enclosures included in an egg production facility and having a differential illumination system 100. Each enclosure 101 houses a group of animals that can move within the enclosure, but are restricted from moving between different enclosures. The enclosure 101 includes one or more aviary systems 103 located within the enclosure. The chicken 105 or other poultry or animals housed in the enclosure 101 can move freely between the enclosure 101 and the aviary system 103 through one or more openings in the aviary system 103.

An aviary system 103 is a structure for housing chicken 105 or other poultry or animals in an interior volume 104 thereof, and for providing various services to the chicken. The aviary system 103 can include supply lines, augers, and/or belt conveyors for conveying inputs to and outputs from the system. For example, the aviary system 103 can supply feed, water, and/or light to the chicken, and can remove litter and recover eggs laid by the chicken. The interior volume 104 of the aviary system 103 can thus include different areas or systems designed or designated for different purposes. For example, the aviary system 103 can include a nest area for laying eggs, one or more feeding or drinking areas for providing food or water to the chicken, one or more roosting areas, or the like.

The enclosure 101 may also include different areas or systems designed or designated for different purposes. For example, the enclosure 101 can include a scratching area, located for example on a floor of the enclosure 101 (e.g., a portion of the floor located underneath the aviary system 103, a portion of the floor located next to or around the aviary system, in an aisle between two or more aviary systems 103, or the like), on top of an aviary system 103 within the enclosure 101, outside of a barn in a case in which the enclosure 101 includes an outdoor section, or the like. The scratching area may be designed for use in scratching, pecking, and/or dust bathing. In some examples, the enclosure may additionally or alternatively include one or more perches or roosting areas separate from the aviary system 103.

Various light sources 107, 109 may be installed to provide illumination in the enclosure 101 and in the aviary system 103. The light sources 107, 109 may be incandescent bulbs, fluorescent lights, light-emitting diode (LED), or other suitable lamps. Each light source 107, 109 produces light with a particular spectrum or selection of radiation wavelengths. Each light source 107, 109 illuminates a designated area of the enclosure 101 and/or aviary system 103. In the example of FIG. 1, for instance, the light sources 107 are located in the enclosure 101 (but outside of the aviary system 103), and are located and oriented so as to illuminate areas located above the aviary system 103 and underneath the aviary system 103. In the example, the light sources 109 are located within the aviary system 103 (e.g., on each of two or more levels within the aviary system), and are located and oriented so as to illuminate areas located within the internal volume 104 of the aviary system 103.

In some examples, the light sources 107, 109 may be directional light sources. Directional light sources produce a directed beam 111 of light having a given width or angle 113 (e.g., a beam angle less than 60 degrees), and are designed to predominantly (or only) provide illumination in a given direction or location. In the example of FIG. 1, for instance, the directional light sources 107 are designed (and mounted and oriented) to concentrate their illumination on an upper surface above the aviary system 103, and in a floor region located underneath the aviary system 103, so as to minimize or avoid the illumination from the sources 107 from penetrating inside of the aviary system 103 (e.g., the light sources 107 are directed away from openings between the internal volume of the aviary system and the enclosure). Conversely, the directional light sources 109 are designed (and mounted and oriented) to concentrate their illumination within the aviary system 103, so as to minimize or avoid illumination from the sources 109 from penetrating outside of the aviary system 103 (e.g., the light sources 109 are directed away from openings between the internal volume of the aviary system and the enclosure).

Each light source 107, 109 produces light with a particular spectrum or selection of radiation wavelengths. As a result, one light source (or group of light sources) can produce light having one color or spectrum, while another light source (or group of light sources) can produce light having a different color or spectrum. Additionally, a single light source (or group of light sources) can selectively produce light having a different color or spectrum at different times (e.g., the light source can be controlled to produce light of one color now, and to produce light of a different color at another later time). The light sources 107, 109 may also be dimmable, such that the intensity of illumination produced by a light source can be selected or changed. Additionally, a single light source can selectively produce light having a different color at different dimming levels (e.g., the light can produce a white light at high lighting intensities, and a reddish light when dimmed to a lower lighting intensity). The color (or spectrum) and intensity of a group of multiple light sources may be controlled together: as such, all light sources 107 providing illumination outside of the aviary system 103 may be controlled together (such that they all provide a similar color and intensity of lighting), while all light sources 109 providing illumination inside of the aviary system 103 may be controlled together.

The light sources 107 and 109 may thus be used to encourage (promote) or discourage certain behaviors of chicken located in the enclosure 101 and in the aviary system 103 by causing the light sources to produce light with different spectrums.

Figure 2:
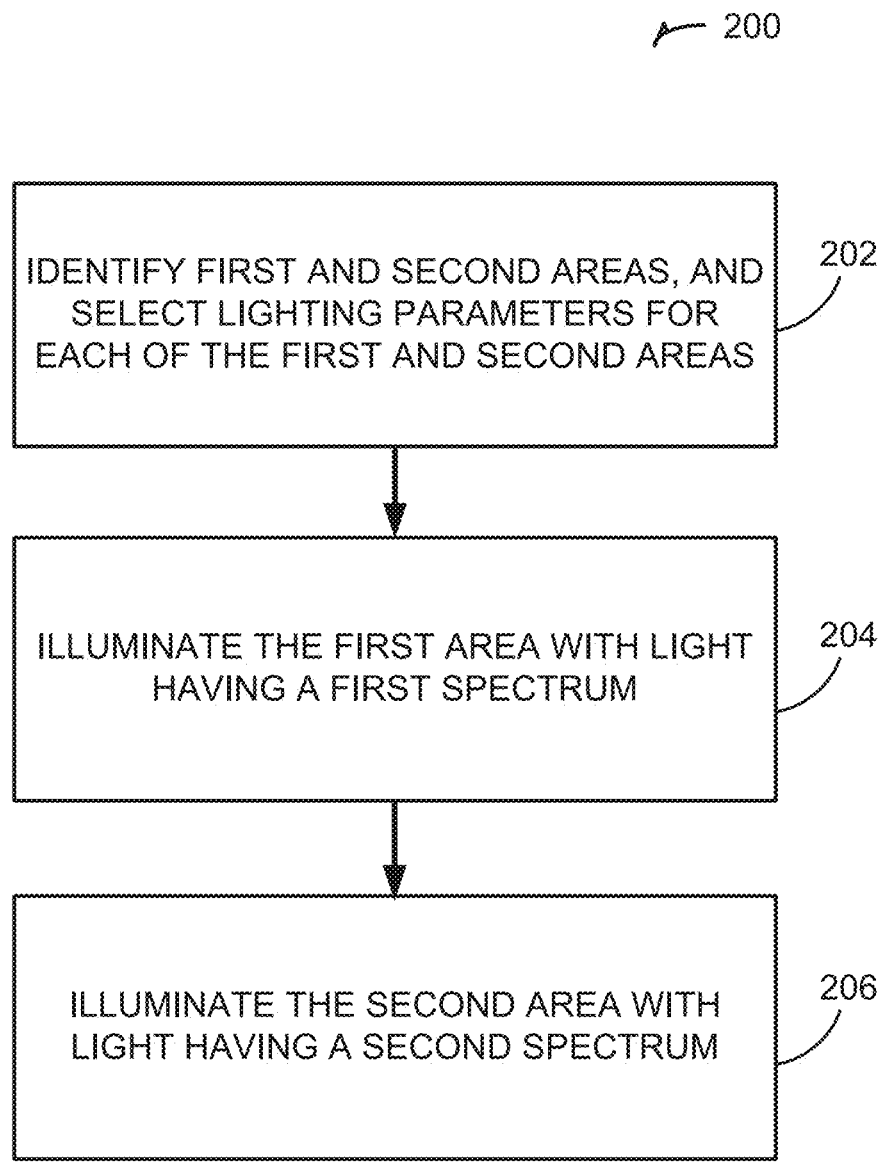
FIG. 2 is a flow chart illustrating a method for controlling lighting and illumination in order to provide differential illumination.

FIG. 2 is a flow chart illustrating a method 200 for controlling lighting and illumination, and in particular for providing differential illumination to control or affect animal behavior. The method 200 begins in operation 202 by identifying two or more areas in which to provide differential lighting. In one example, first and second areas may respectively correspond to an area forming part of an enclosure having an aviary system located therein, and an area forming part of an internal volume of the aviary system.

Operation 202 may further include selecting lighting parameters for each of the identified areas. Lighting parameters can include lighting state (on/off), lighting intensity, and lighting color or spectrum. The lighting parameters may be constant parameters, or time-varying parameters. For example, time-varying parameters may provide for variations in lighting intensity and/or color at different times of day, of week, of month, or of year. The time-varying parameters may further provide for variations in lighting intensity and/or color based on an age of animals in the enclosure or aviary system. In the example, light having a first spectrum may be selected for the first area, while light having a second spectrum different from the first spectrum may be selected for the second area.

In operations 204 and 206, the first and second areas are respectively illuminated with light having the first and second spectrums. In the example, the first area may be illuminated with light having a first spectrum having a higher red component than the second spectrum, while the second area may be illuminated with light having a second spectrum having a higher blue component than the first spectrum. Operations 204 and 206 may further include dimming or increasing the lighting intensity of the light in one or both of the areas, or changing the spectrum composition of the lighting in one or both of the areas.

In a first example, the light sources 109 produce red light (e.g., substantially red or reddish light) having a higher red component than the light produced by the light sources 107, so as to encourage the animals to roost, feed, and/or lay eggs inside the aviary system 103. Conversely, the light sources 107 produce blue light (e.g., substantially blue or blueish light) having a higher blue component than the light produced by the light sources 109, so as to discourage the animals from roosting and laying eggs outside of the aviary system 103.

In a second example, the light sources 109 produce a substantially red light having a first intensity, and the light sources 107 produce a substantially blue light having a second intensity. In order to encourage the chicken to gather inside the aviary system at dusk, the light sources 109 may initially be dimmed to produce a substantially red light having a third intensity lower than the first intensity. As the light sources 109 are dimmed, the spectrum of the light sources may change so as to increase the relative intensity of red light within the spectrum. The intensity of the lighting from the light sources 107 may be sustained temporarily to encourage the chicken to move into the dimmed or darkened aviary system 103. The intensity of the lighting from the light sources 107 may be reduced only at a later time, for example when the chicken has had a chance to move into the aviary system 103 for the night.

In a third example, the light sources 109 produce a substantially red light having a first intensity, and the light sources 107 produce a substantially blue light having a second intensity. In order to encourage the chicken to move out of the aviary system 103 (e.g., to enable the aviary system 103 to be cleaned), the light sources 107 may transition to produce a substantially red light while the light sources 109 transition to produce a substantially blue light. The blue light produced by the light sources 109 inside of the aviary system 103 may encourage the chicken to move out of the aviary system 103, while the red light produced by the light sources 107 in the enclosure 101 may encourage the chicken to rest in the enclosure 101.

Figure 3:
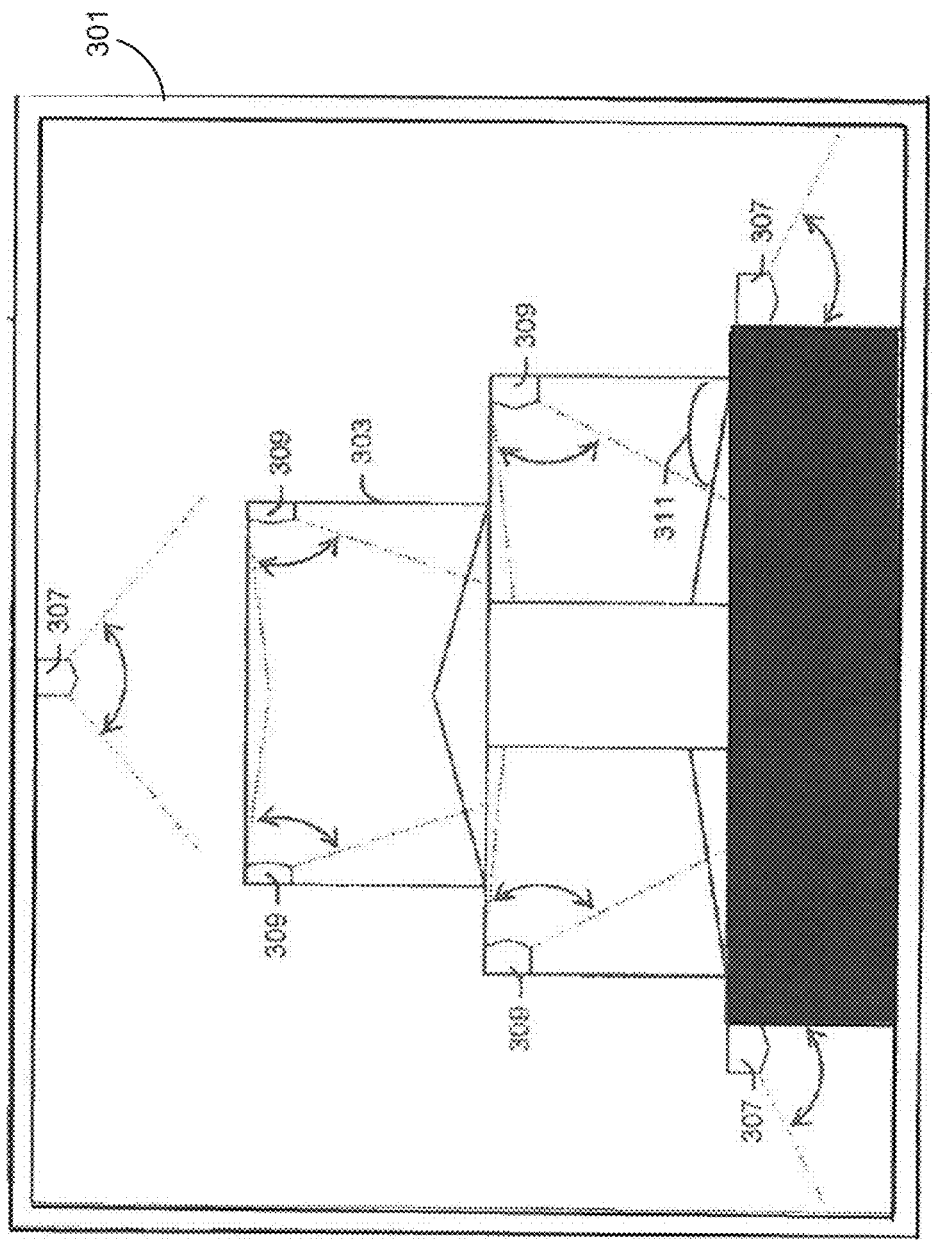
FIG. 3 shows a cross-sectional view of an enclosure containing an aviary system and having a differential illumination system.

FIG. 3 shows a cross-sectional view of a second enclosure 301 containing one or more aviary systems 303 for housing animals. In the example of FIG. 3, light sources 307 provide illumination having a first spectrum (e.g., a blue light spectrum) to at least some areas in the enclosure 301, such as areas located above or on top of the aviary system 303, and floor areas located next to or around the aviary system 303. The first spectrum may be selected to substantially reduce or eliminate egg laying in the areas illuminated by the light sources 307. Light sources 309 provide illumination having a second spectrum (e.g., a red light spectrum) to at least some areas within the aviary systems 303. The second spectrum may be selected to encourage or promote egg laying in the areas illuminated by the light sources 309. Some areas 311 within the aviary system 303 may receive substantially no illumination, or may receive no direct illumination from directional light sources 307 or 309.

Figure 4:
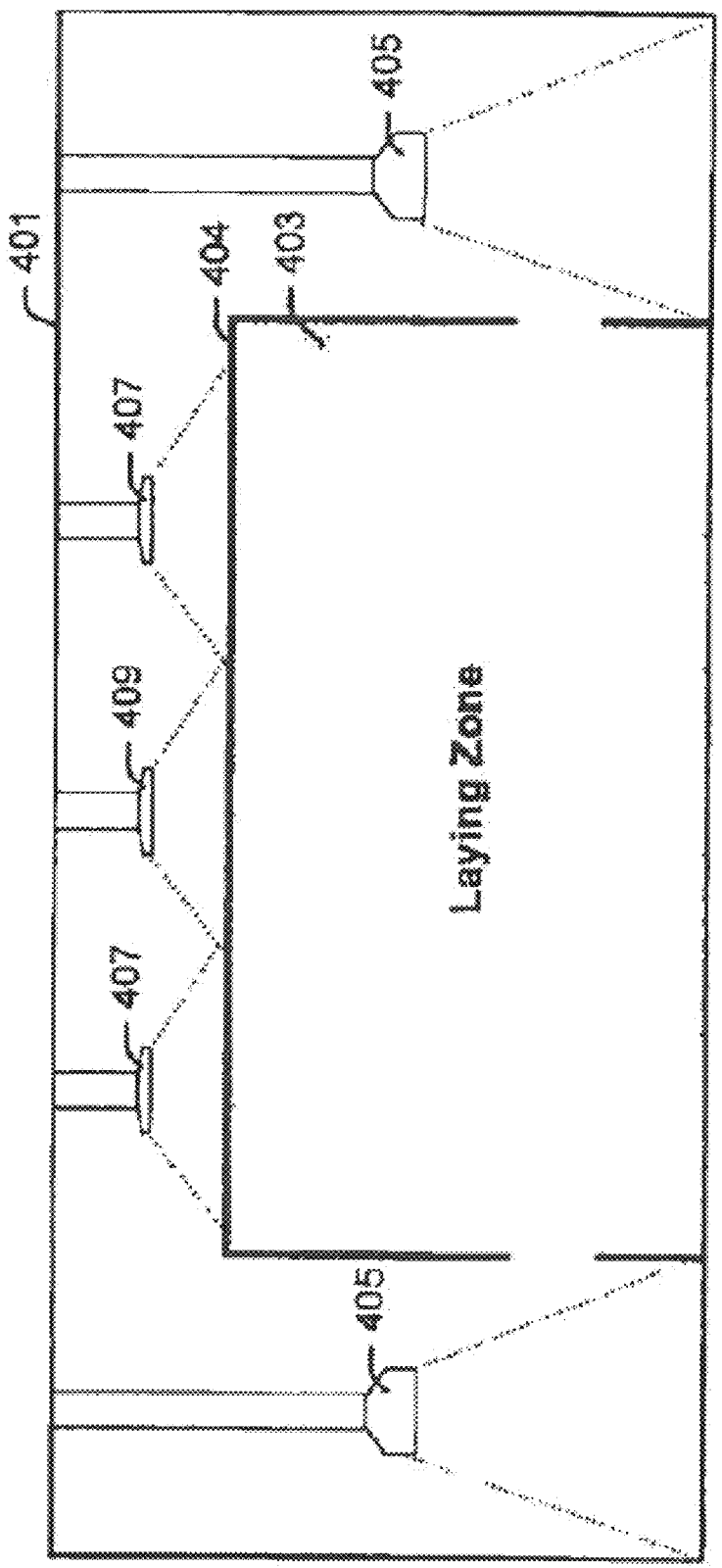
FIG. 4 shows a cross-sectional view of an enclosure containing an egg laying zone and having a differential illumination system.

FIG. 4 shows a cross-sectional view of a third enclosure 401 containing one or more egg laying zones 403. In the example shown, the enclosure 401 may alternatively correspond to an aviary system. The enclosure 401 includes various light sources 405, 407, and 409, which may each provide illumination having the same or different spectrums. For instance, light sources 405 may produce light with a first spectrum for encouraging scratching behavior, while light sources 407 and 409 may produce light with a second spectrum for encouraging roosting behavior. At least portions of the egg laying zone 403 may be surrounded by an opaque or substantially opaque barrier 404 which is used to limit the amount of illumination from the light sources 405, 407, and 409 which penetrates within the egg laying zone 403.

Figure 5:
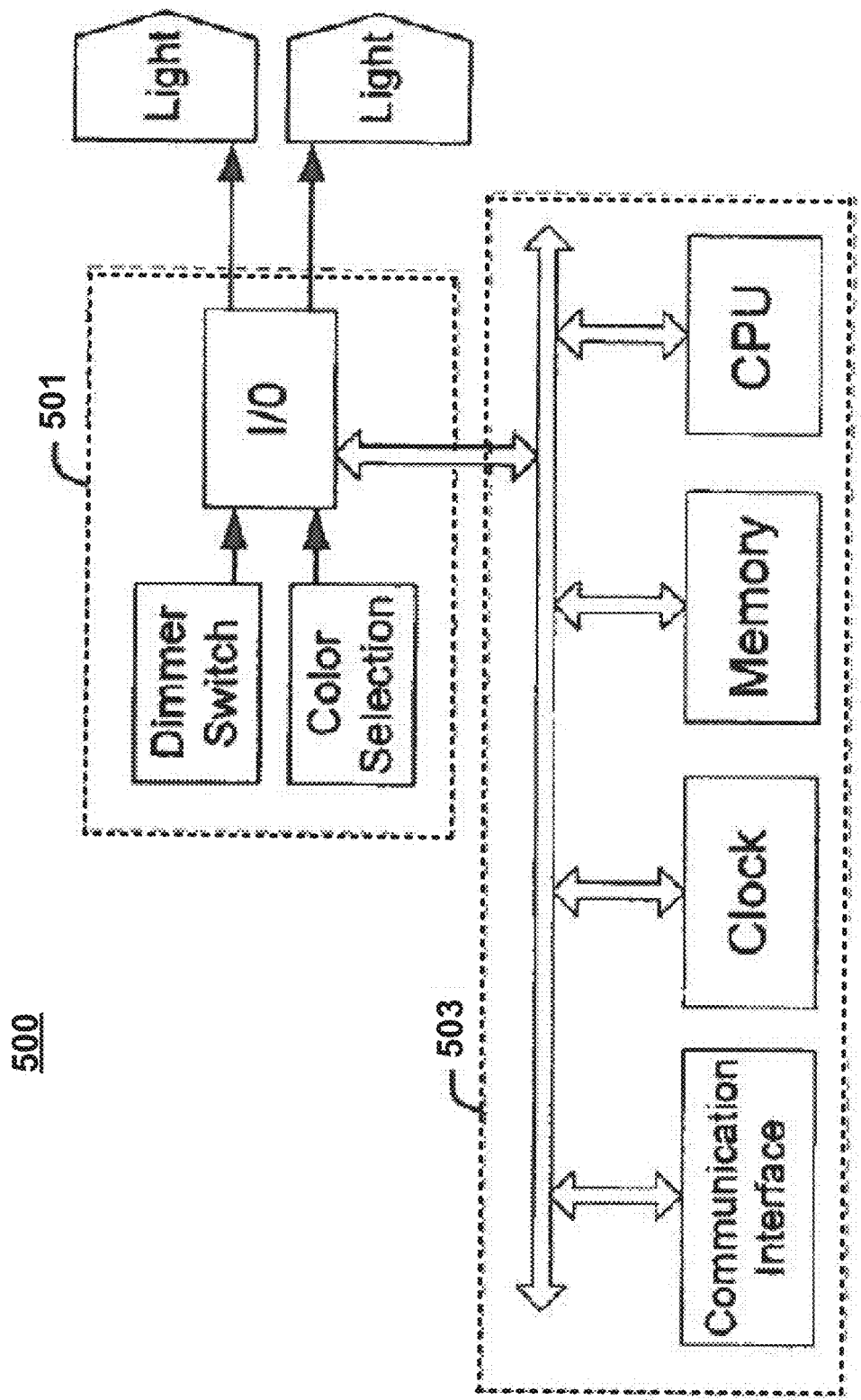
FIG. 5 shows a control system for controlling lighting and illumination produced by a differential illumination system.

FIG. 5 shows a control system 500 for controlling lighting in an egg production facility having a differential illumination system, such as system 100. The control system 500 can include various manual controls 501 to enable the lighting state (on/off), lighting intensity, and lighting color or spectrum to be selected for one or more light sources. For example, the manual controls may include a dimmer switch or module, a color selection switch or module, and other switches or modules to control one or more light sources.

The control system 500 can additionally or alternatively include automated controls to manage the lighting state of light sources. A processing system 503 can perform partially automated or fully automated control of one or more light sources, and can include one or more processors or CPUs, one or more memories, a clock, and a communication interface (e.g., network interface, user interface, and/or the like). The memory can be a non-transitory machine readable medium storing machine readable instructions for execution by the one or more processors, including instructions for selectively controlling light sources as described herein.

Figure 6:
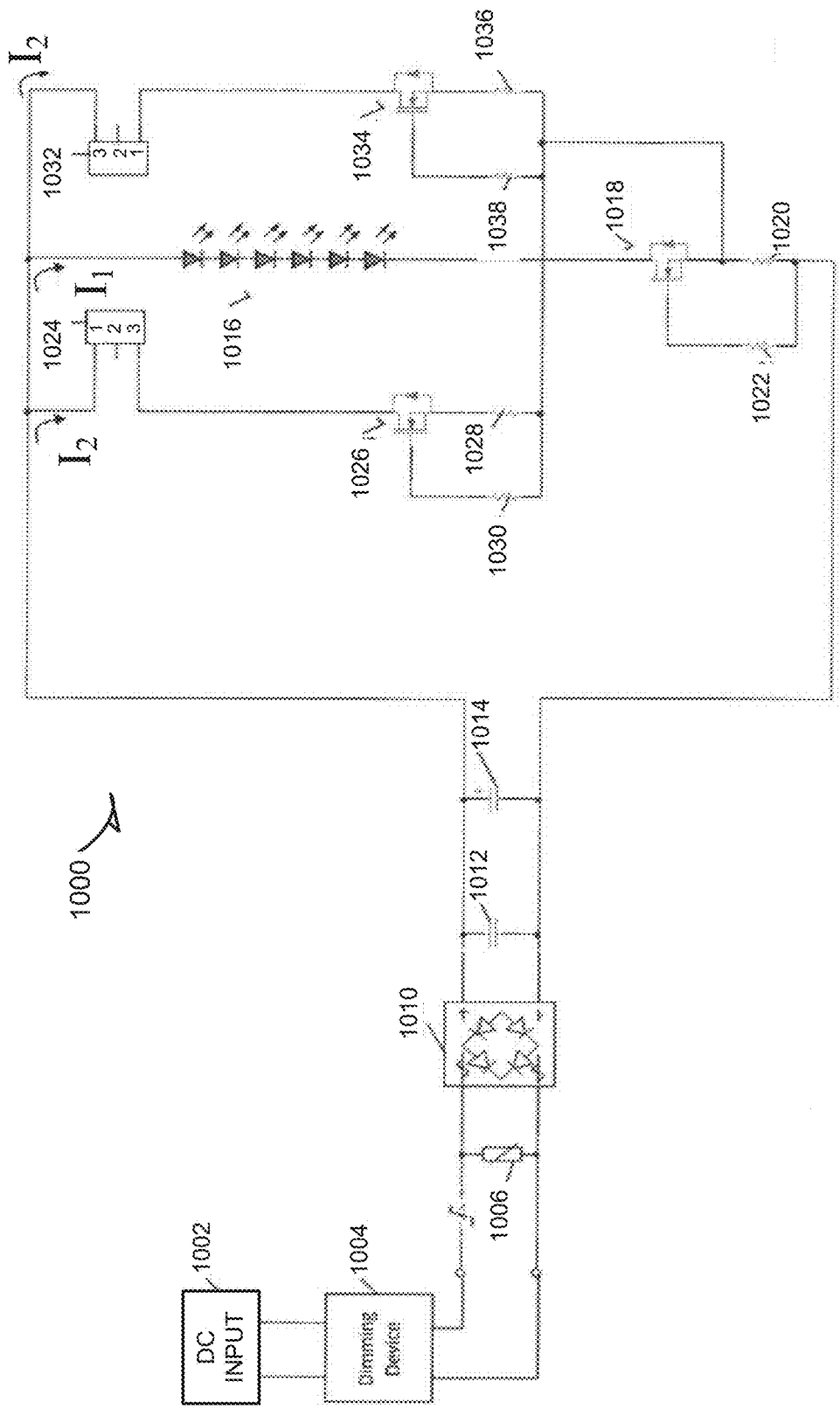
FIG. 6 shows a schematic diagram of a driving circuit for a lighting assembly.
Figure 7:
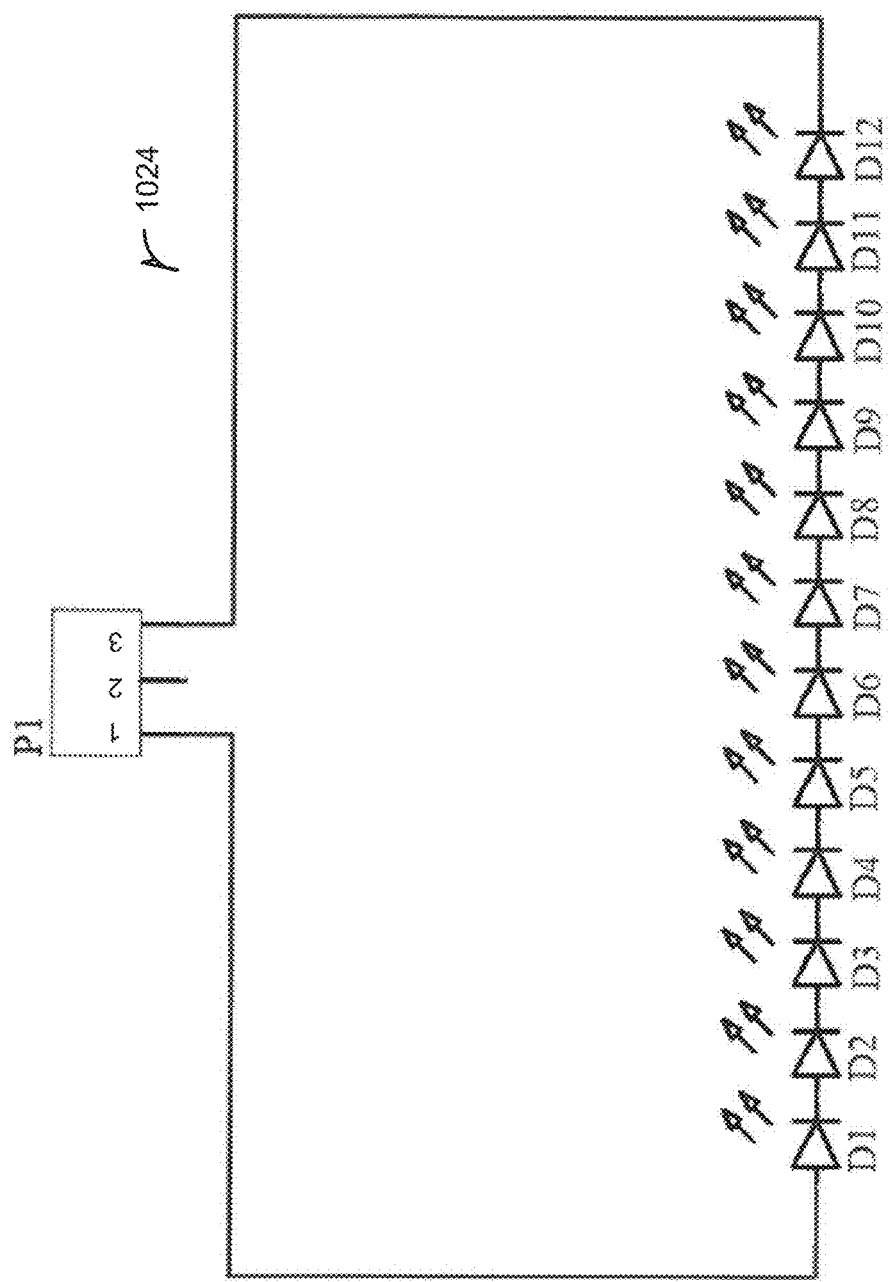
FIG. 7 shows a schematic diagram of a section of a pathway of a driving circuit for a lighting assembly.
Figure 8:
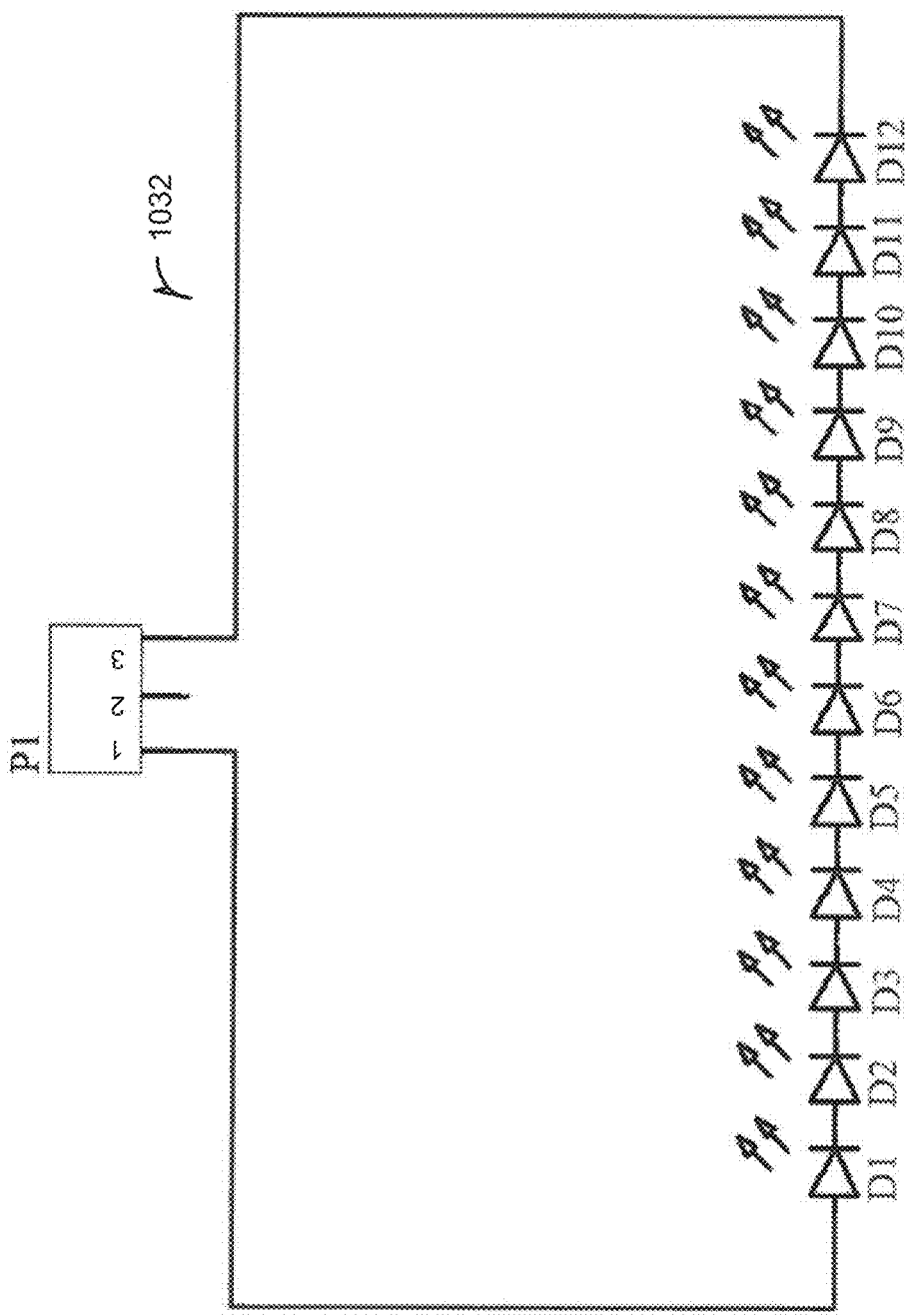
FIG. 8 shows a schematic diagram of a section of a pathway of a driving circuit for a lighting assembly.

FIGS. 6-8 show the schematic diagrams of the driving circuitry 1000 for each individual light source 107, 109, 307, 309, 405, 407, or 409. The driving circuitry 1000 of this embodiment has a DC input 1002 for a dimming device 1004. The driving circuitry 1000 additionally has protection devices 1006 such as MOVs provided for surge protection and a bridge rectifier 1010 that receives the DC input to provide a safety feature in case the DC input 1002 is improperly installed. The rectifier 1010 is optionally placed in parallel with first and second capacitors 1012, 1014 to provide additional control over the circuitry 1000.

A first network of LEDs 1016 is electrically connected to the DC input to receive an input voltage and in series with a first transistor 1018 that is electrically and controllably connected to first and second resistors 1020 and 1022. The transistor can be of any type, depletion mode, enhancement mode or the like without falling outside the scope of this disclosure. In an example embodiment, the first network of LEDs 1016 are blue LEDs or present wavelengths in the range between 450 nm-495 nm. Also electrically connected to the first network of LEDs 1016 is the second network of LEDs 1024 that are in series with a second transistor 1026 that is electrically and controllably connected to third and fourth resistors 1028 and 1030 and provide a bypass pathway for the current. Specifically, more LEDs are provided in the second network of LEDs 1024 than the first network of LEDs 1016 to provide a larger voltage before current begins to flow through the second network of LEDs 1024 than the first network of LEDs 1016. In an example embodiment, the second network of LEDs 1024 are red (e.g., present wavelengths between 620 nm-750 nm) and white.

Optionally, a third network of LEDs 1032 is provided that is in series with a third transistor 1034 that is electrically and controllably connected to fifth and sixth resistors 1036 and 1038. More LEDs are provided in the third network of LEDs 1032 than the first network of LEDs 1016 to provide a larger voltage before current begins to flow through the third network of LEDs 1032 than the first network of LEDs 1016. One skilled in the art will appreciate that the second and third networks of LEDs 1024 and 1032 could be combined without falling outside the scope of this invention. The advantage of using these two separate networks of LEDs 1024 and 1032 is to minimize variation in current through the circuit.

In operation as the dimming device 1004 is actuated and voltage is increased, when a first predetermined voltage is reached, current flows through a first path $I_1$ and through the first network of LEDs 1016. Because there are more diodes in the second and third networks of LEDs 1024 and 1032, the predetermined voltage required to cause current to flow through the second and third networks 1024 and 1032 is not reached and current only flows through the first path $I_1$.

As the dimming device 1004 is further actuated and voltage is increased the intensity of the first network of LEDs 1016 increases until a first threshold voltage of the first transistor 1018 is reached. At the first threshold voltage the first transistor 1018 limits the current flowing through the first path $I_1$.

As the dimming device 1004 continues to increase the voltage, a second predetermined voltage related to the second and third networks of LEDs 1024 and 1032 is reached causing current to begin flowing through the second and third networks of LEDs 1024 and 1032. As a result of the flow of current through the second and third networks 1024 and 1032, or through a bypass path 12, current flows to the first resistor 1020 causing an increase in voltage, causing the first transistor 1018 to begin shutting down, thus decreasing the current flow through the first network of LEDs 1016. As the dimming device is actuated to further increase voltage, the current through the second and third networks of LEDs 1024 and 1032 continues to increase, increasing the intensity of the LEDs in the second and third networks 1024 and 1032 while simultaneously increasing the voltage at the first transistor 1018 causing a proportional decrease in intensity of the first network of LEDs 1016 until approximately no current remains flowing through the first network of LEDs 1016. Then as the voltage continues to increase until the threshold voltage of the second and third transistors 1026 and 1034 is reached thus limiting current flow through the second and third networks of LEDs 1024 and 1032.

Thus, in the embodiment wherein the first network of LEDs 1016 are blue and the second and third networks of LEDs 1024 and 1032 are a combination of red and white, as the voltage increases, once the first predetermined voltage is reached the first network of LEDs 1016 provides a blue output and increases in intensity as a function of increasing voltage until the threshold voltage of the first transistor 1018 is reached causing the current to plateau. Then as voltage continues to increase a second predetermined voltage related to the number of diodes in the second and/or third networks 1024 and 1032 is reached causing current to flow through the second and third network of LEDs 1024 and/or 1032 causing the red and white LEDs begin to emit light. As the voltage continues to increase the intensity of the red and white LEDs continues to increase and simultaneously current flowing from the second and/or third networks of LEDs 1024 and/or 1032 causes a voltage increase at the first transistor 1018 that continues to close the first transistor 1018 decreasing intensity of the blue LEDs as the intensity of the red and white LEDs increase until the blue LEDs receive approximately no current, effectively turning off the blue LEDs. As voltage continues to increase the intensity of the red and white LEDs continues to increase until the threshold voltages of the second and third transistors 1018 and 1034 are reached limiting additional current flow.

When the DC input 1002 is at the maximum voltage, current flows along bypass path 12 with approximately no current flowing through the first current path $I_1$. In this manner the first current path $I_1$ is being bypassed at the maximum voltage. Thus, in the embodiment described, only the red and white LEDs or the second and third networks of LEDs 1024 and 1032 provide light from the system 103.

As the dimming device 1004 is actuated and voltage is decreased to the point where the second and third transistors 1026 and 1034 reach their threshold voltages causing the reduction of voltage caused by the dimming device 1004 to be proportional to the reduction in intensity of the second and third networks 1024 and 1032 as voltage is decreased. Simultaneously the current flowing to the first resistor 1020 is reduced, reducing voltage at the first transistor 1018 opening the transistor thus causing current flow to the first network of LEDs 1016 to increase until the second predetermined voltage is reached causing the current to no longer be able to flow through the second and third network of LEDs 1024 and 1032. At this point the first network of LEDs 1016 is at its maximum intensity. Then as the dimming device 1004 is used to further decrease the voltage the first network of LEDs decrease in intensity proportional to the decrease in voltage until the first predetermined voltage is reached and current stops flowing through the first network of LEDs 1016.

In this manner, in the embodiment where the second and third networks of LEDs 1024 and 1032 are red and white, and the first network of LEDs are blue, the system through the dimming device 1004 is dimmed from a red and white light to a blue light. In this manner the light output can be controlled to match that of an avian in the system 103.

Figure 9:
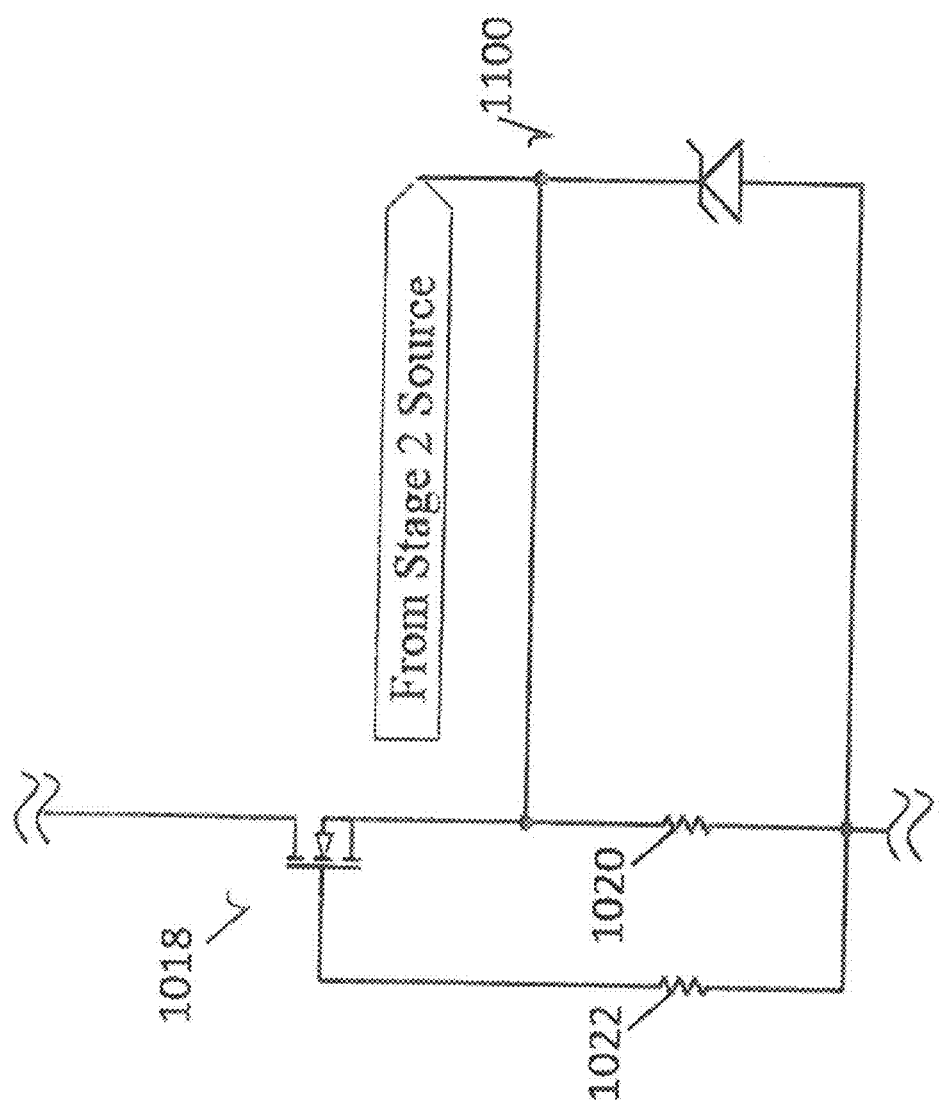
FIG. 9 shows a schematic diagram of a section of the driving circuit for a lighting assembly.

FIG. 9 shows a shunt voltage regulator 1100 that improves efficiencies of the driving circuitry 1000. Specifically, the first and second resistors 1020 and 1022 are arranged to controllably operate the first transistor 1018 as described above. By placing a shunt voltage regulator 1100 in parallel with the first resistor 1020 and giving the shunt voltage regulator a threshold voltage greater than the threshold voltage to turn off the first transistor 1018, when the below the threshold voltage of the shunt voltage regulator the first transistor 1018 is biased as described above as though the shunt voltage regulator 1100 is not within the circuit. Then, the threshold voltage of the first transistor 1018 is reached shutting off the first transistor 1018 as discussed above and as the voltage continues to increase, the threshold voltage of the shunt voltage regulator 1100 is reached. At this time the shunt voltage regulator 1100 starts conducting, holding the voltage at a predetermined level and preventing a voltage increase and thus reducing the total volts and thus watts used by the lamp. Thus, when the first network of LEDs 1016 are off the diodes clamp at the threshold voltage of the shunt voltage regulator to reduce the volts within the system, thus reducing and saving power or Watts of the assembly making the entire assembly more efficient.

In an embodiment, the shunt voltage regulator 1100 is a zener diode, in other embodiments the shunt voltage regulator 1100 is a plurality of diodes, including three or four diodes, a diode in combination with transistors, or the like that function to shunt voltage within the system. While the current circuit 1000 is a DC based system, one skilled in the art will appreciate that the arrangement of the first transistor 1018 and controlling resistors 1020 and 1022 are also functional within an AC based circuits and a shunt voltage regulator 1100 would similarly enhance efficiencies in AC based circuits as well. This embodiment is particularly effective at improving efficiencies when the first stage has a low current compared to the peak current, such as for example only 25 mA of the first stage compared to 150 mA of the assembly. Thus, all of the stated objects have been met.

A reference to an element in the singular is not intended to mean "one and only one" unless specifically so stated, but rather "one or more." For example, a light source may refer to one or more light sources, an aviary system may refer to one or more aviary systems, a light or light spectrum may refer to one or more lights or light spectrums, a control signal may refer to one or more control signals, and a signal may refer to differential voltage signals. Unless specifically stated otherwise, the term "some" refers to one or more.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

In one aspect of the disclosure, when actions or functions are described as being performed by an item (e.g., producing, selecting, controlling, illuminating, determining, providing, generating, or any other action or function), it is understood that such actions or functions may be performed by the item directly or indirectly. In one aspect, when an element or module is described as performing an action, the element or module may be understood to perform the action directly. In one aspect, when an element or module is described as performing an action, the element or module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed:

1. A method for influencing animal behaviors, comprising:
   providing a lighting assembly in an animal enclosure, the lighting assembly comprising driving circuitry, the driving circuitry adapted to receive an electrical excitation signal from a direct current (DC) input varied in intensity by a dimming device that actuates to increase or decrease a voltage of the electrical excitation signal, the driving circuitry including a first plurality of light emitting diodes (LEDs) in a first path in parallel relation to a second plurality of light emitting diodes (LEDs) in a second path, the first plurality of LEDs having a first threshold voltage, and the second plurality of LEDs having a second threshold voltage greater than the first threshold value, and a current limiting device within the first path;

increasing the voltage to an amount between the first threshold voltage and the second threshold voltage so that the first plurality of LEDs are emitting light of a first color, wherein the first color elicits a first behavior in an animal in the animal enclosure;

increasing the voltage to an amount above the second threshold voltage so that the second plurality of LEDs are emitting light of a second color, wherein the second color elicits a second behavior in the animal;

wherein, at the second voltage, the current limiting devices limits the current to the first plurality of LEDs.

2. The method of claim 1, wherein the current limiting device is a transistor.

3. The method of claim 1, wherein the first plurality of LEDs have a first color characteristic and the second plurality of LEDs have a second color characteristic.

4. The method of claim 3, wherein the first color characteristic is chosen from the group consisting of white light, red light, blue light, and green light and the second color characteristic is selected from the group consisting of white light, red light, blue light, and green light; and wherein the first color characteristic is not the same as the second color characteristic.

5. The method of claim 3, wherein the first color characteristic is white, and the second color characteristic is blue.

6. The method of claim 1, further comprising a third plurality of LEDs in a third path in parallel to the first plurality of LEDs and having a third threshold voltage that is greater than the first threshold voltage.

7. The method of claim 6, wherein the second and third threshold voltages are equal.

8. The method of claim 6, wherein the first, second and third pluralities of LEDs each have separate color characteristics.

9. A method for influencing animal behaviors, comprising:
providing a lighting assembly in an animal enclosure, the lighting assembly comprising driving circuitry, the driving circuitry adapted to receive an electrical excitation signal from a direct current (DC) input varied in intensity by a dimming device that actuates to increase or decrease a voltage of the electrical excitation signal, the driving circuitry including a first plurality of light emitting diodes (LEDs) in a first path in parallel relation to a second plurality of light emitting diodes (LEDs) in a second path, the first plurality of LEDs having a first threshold voltage, and the second plurality of LEDs having a second threshold voltage less than the first threshold value, and a current limiting device within the second path;

providing the voltage at an amount greater than the first threshold voltage, wherein only the first plurality of LED's are emitting light and wherein the firsts color characteristic elicits a first behavior in an animal in the animal enclosure;

decreasing the voltage to an amount between the first threshold voltage and the second threshold voltage so that the second plurality of LEDs are emitting light of a second color, wherein the second color elicits a second behavior in the animal;

wherein, at the first voltage, the current limiting devices limits the current to the first plurality of LEDs.

10. The method of claim 9, wherein the current limiting device is a transistor.

11. The method of claim 9, wherein the first plurality of LEDs have a first color characteristic and the second plurality of LEDs have a second color characteristic.

12. The method of claim 11, wherein the first color characteristic is chosen from the group consisting of white light, red light, blue light, and green light and the second color characteristic is selected from the group consisting of white light, red light, blue light, and green light; and wherein the first color characteristic is not the same as the second color characteristic.

13. The method of claim 11, wherein the first color characteristic is white, and the second color characteristic is blue.

14. The method of claim 9, further comprising a third plurality of LEDs in a third path in parallel to the first plurality of LEDs and having a third threshold voltage that is less than the first threshold voltage.

15. The method of claim 14, wherein the second and third threshold voltages are equal.

16. The method of claim 14, wherein the first, second and third pluralities of LEDs each have separate color characteristics.

* * * * *